United States Patent [19]

Beton

[11] Patent Number: 5,106,350
[45] Date of Patent: Apr. 21, 1992

[54] DIFFERENTIAL WITH REMOVABLE RACE INSERT OF END BEARING SUPPORT FOR A DRIVING PINION

[75] Inventor: Gordon Beton, Yokohama, Japan

[73] Assignee: SKF Industrial Trading and Developing Co./B.V., Nieuwegein, Netherlands

[21] Appl. No.: 606,118

[22] Filed: Oct. 31, 1990

[30] Foreign Application Priority Data

Nov. 8, 1989 [NL] Netherlands .................. 8902771

[51] Int. Cl.$^5$ .............................................. F16H 1/40
[52] U.S. Cl. .................................. 475/246; 475/230; 384/585
[58] Field of Search .............. 475/220, 230, 246, 253; 384/585, 569

[56] References Cited

U.S. PATENT DOCUMENTS

| 1,506,037 | 8/1924 | Alden et al. ........................ 475/246 |
| 2,651,216 | 9/1953 | Alden .............................. 475/230 X |
| 4,223,570 | 9/1980 | Yamamori et al. ............. 384/569 X |
| 4,402,238 | 9/1983 | Craig .................................... 475/230 |
| 4,468,981 | 9/1984 | Ries .................................. 475/220 X |
| 4,597,312 | 7/1986 | Hicks et al. ....................... 475/230 X |

FOREIGN PATENT DOCUMENTS

| 1455882 | 8/1969 | Fed. Rep. of Germany ...... 475/246 |
| 0017747 | 1/1986 | Japan .................................. 745/220 |
| 0683836 | 12/1952 | United Kingdom ............. 475/246 |
| 1400890 | 7/1975 | United Kingdom ............. 475/246 |

Primary Examiner—Leslie A. Braun
Assistant Examiner—Khoi Q. Ta
Attorney, Agent, or Firm—Rosen, Dainow & Jacobs

[57] ABSTRACT

Differential with a housing containing a pinion in the form of a bevel gear which together with a shaft section—constituting one unit with it and projecting from its wide top face—is held by bearings in the housing, whereby the shaft section may be connected and driven by a drive shaft, a crown gear which operates in conjunction with the pinion and is coupled to or constitutes one unit with a rotating satellite housing located in the housing, in which two freely rotating opposing satellites are held by bearings each of which operate in conjunction with two opposing gears which are each connected to a wheel shaft, whereby the pinion constitutes one unit with a second shaft section—projecting from the narrow top face—which is held in the housing by means of roller bearing which has an outer race installed in an opening in the housing and an inner race installed around the second shaft section, characterized by the fact that the inner race of the aforementioned roller bearing is formed by the cylindrical outer circumferential plane of a generally cap-shaped element with a bottom and a cylindrical mantle rising vertically from it, which is slid from the outside over the second shaft section so that the inside surface of the bottom of the element rests against the top face of the shaft section.

8 Claims, 2 Drawing Sheets

DIFFERENTIAL WITH REMOVABLE RACE INSERT OF END BEARING SUPPORT FOR A DRIVING PINION

BACKGROUND OF THE INVENTION

The invention relates to differential drive mechanisms. The invention concerns a differential with a housing containing a pinion in the form of a bevel gear which together with a shaft section—constituting one unit with it and projecting from its wide top face—is held by bearings in the housing, whereby the shaft section may be connected and driven by a drive shaft, a crown gear which operates in conjunction with the pinion and is coupled to or constitutes one unit with a rotating satellite housing located in the housing, in which two freely rotating opposing satellites are held by bearings each of which operate in conjunction with two opposing gears which are each connected to a wheel shaft, whereby the pinion constitutes one unit with a second shaft section—projecting from the narrow top face—which is held in the housing by means of roller bearing which has an outer race installed in an opening in the housing and an inner race installed around the second shaft section. A similar differential is generally known.

When the pinion is manufactured, the last operation on the unit, consisting of a cone and two shaft sections projecting from it, involves the cutting of the teeth in the circumferential bevel surface of the pinion. This is done by means of a rotating cutter making it impossible to prevent parts of the second shaft section from being touched and removed by the cutter. Thus this shaft section no longer has a completely smooth cylindrical outer circumferential surface.

In some known differentials the inner race of the roller bearing, by means of which the second shaft section of the pinion is held in the housing, is formed by an annular element slid over the second shaft section. The disadvantage of this design is that the annular element is subject to deformation because it is not fully supported on the inside. This is because some parts were cut out of the cylindrical circumferential surface of the second shaft section during manufacture. In addition, the annular element is not installed in an immovable fashion. Therefore it can execute relatively small movements during the operation of the differential. Both of the aforementioned disadvantages may entail that the inner race becomes deformed at a fairly early stage and becomes loose, or that its inside flange breaks so that the differential will no longer function properly and has to be repaired prematurely.

SUMMARY OF THE INVENTION

The objective of the invention is to provide an improved differential which does not present these disadvantages.

This objective is achieved because in the differential according to the invention the inner race of the roller bearing, by means of which the second shaft section of the pinion is held in the housing, is formed by the cylindrical outer circumferential surface of a generally cap-shaped element with a bottom and a perpendicular cylindrical surface, which is slid over the second shaft section so that the inside surface of the bottom of the element rests against the end of the shaft section.

In an inner race executed accordingly in the shape of a cap, the cylindrical surface—which forms the actual inner race—of the cap-shaped element has sufficient stiffness to prevent the aforementioned deformations, while at the same time this surface can be installed so as to be movable with regard to the second shaft section.

Preferably, in the middle of the bottom of the cap-shaped element, there will be an opening and, essentially in the middle of the end of the second shaft section, there will be a blind bore with a female screw thread, whereby a bolt is screwed through this opening into the bore.

In an advantageous embodiment the opening in the bottom of the cap-shaped element may be equipped with a female screw thread so that—after the fastening bolt has been removed—another bolt or similar means with a larger diameter may be screwed into this opening to remove the cap-shaped element from the shaft section.

In another form of execution there is a conical recess in the middle of the end of the second shaft, and a corresponding conical projection extending inward from the middle of the bottom of the cap-shaped element, which projection fits into the recess, so that the conical axes of the recess and the projection coincide, providing a proper alignment of the cap-shaped element with regard to the second shaft section.

BRIEF DESCRIPTION OF THE DRAWINGS

The invention is explained in greater detail with reference to the drawings in which.

DESCRIPTION OF THE PREFERRED EMBODIMENTS

Figure 1:
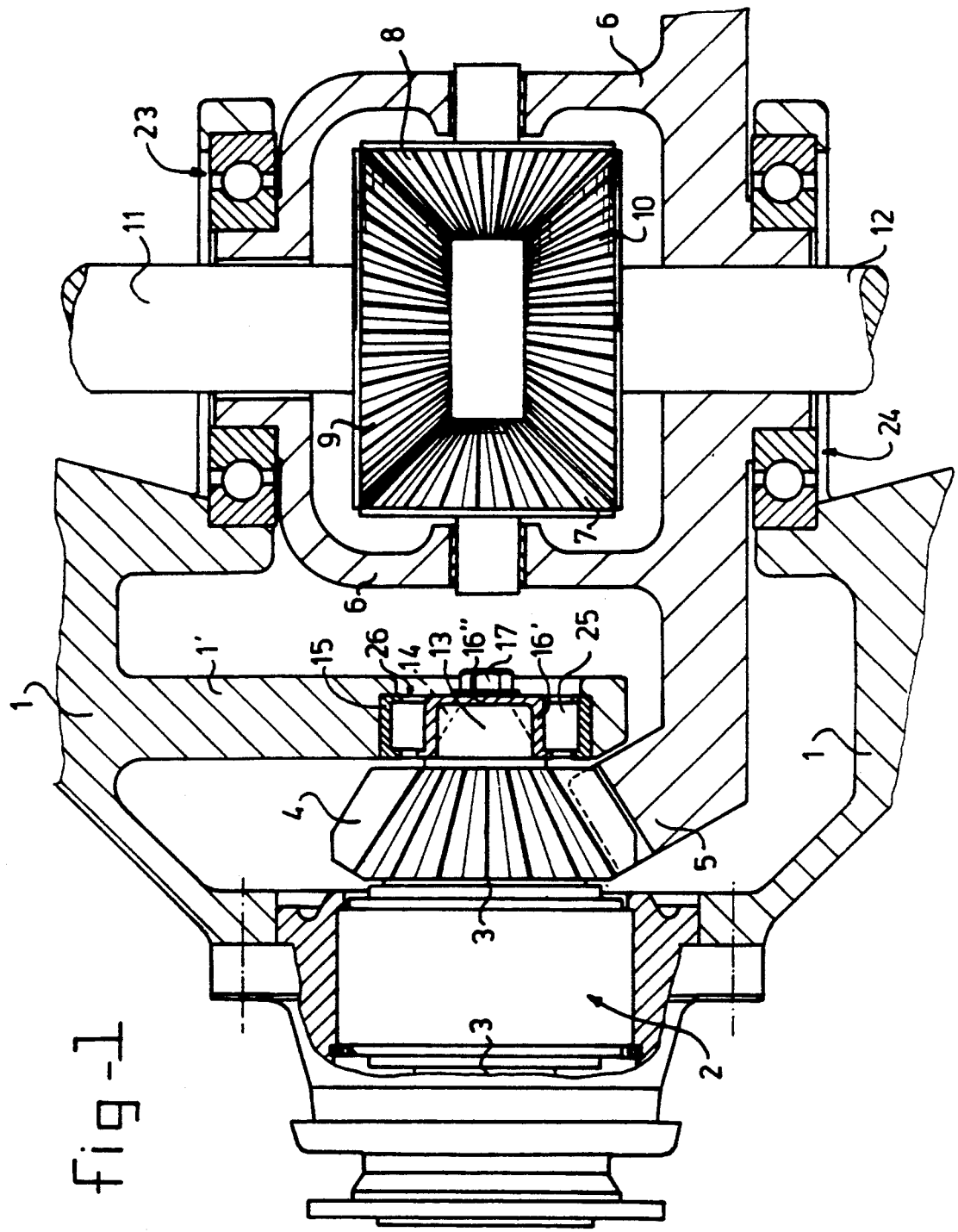
FIG. 1 shows a cross-section of a differential according to the invention.

As shown in FIG. 1 the differential includes a housing 1 in which a first shaft section 3 of a pinion 4 is held by means of a roller bearing 2, which shaft section can be driven by a drive shaft, not shown.

The pinion 4 operates in conjunction with a crown gear 5 which constitutes one unit with a satellite housing 6 which is held in the housing 1 by means of roller bearings 23 and 24.

In the satellite housing 6 two freely rotatable satellites 7 and 8 are held by bearings, each of which operate in conjunction with the bevel gears 9 and 10 which are connected with, respectively, the wheel shafts 11 and 12.

The pinion 4 is equipped with a second shaft section 13 projecting from its narrow end. The circumferential surface of this shaft section 13 presents recesses 14 formed when the teeth of pinion 4 were cut.

Figure 2:
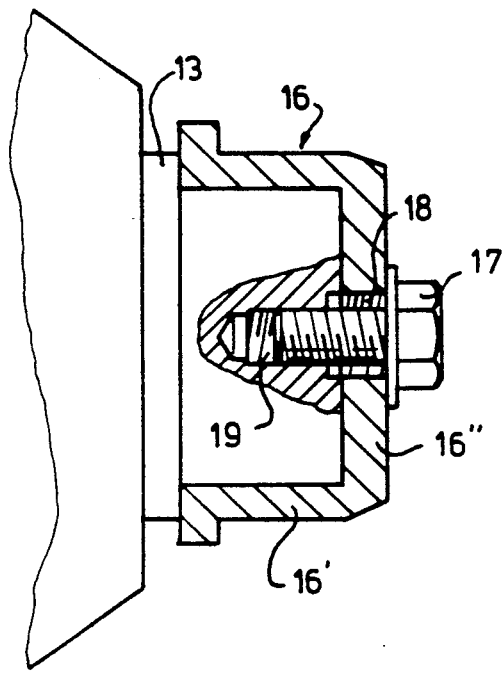
FIG. 2 shows on a larger scale a first installed embodiment of the cap-shaped element according to the invention.
Figure 3:
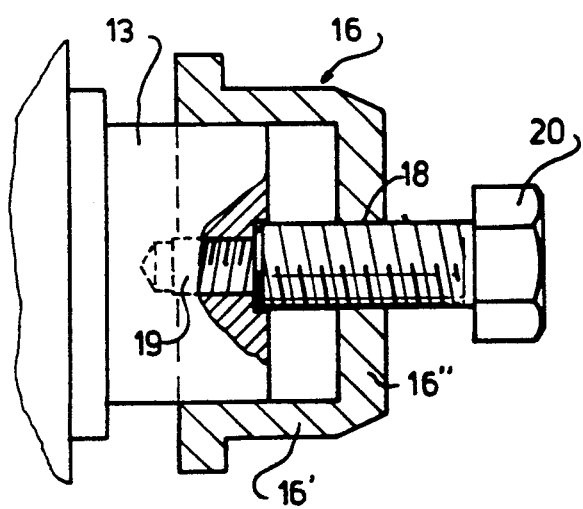
FIG. 3 shows the embodiment according to FIG. 2 while the cap-shaped element is being removed.

The second shaft section 13 is held by a roller bearing 26 in an opening made in an inner wall 1' of the housing 1. This roller bearing 26 includes an outer race 15 which is installed in said opening of the wall 1', an inner race 16' and a number of roller elements 25 located between these races. The inner race 16' is formed by the cylindrical surface 16' of a cap-shaped element 16 which also includes a bottom 16''. The cap-shaped element 16 is fastened by means of bolt 17 with regard to the shaft section 13. FIG. 2 shows the shaft section/bearing assembly by itself, whereby bolt 17 is screwed into a blind bore 19 equipped with a female thread, which bore 19 has been fashioned in the end of the second shaft section 13. The bolt goes through an opening 18 formed in the bottom 16" of the cap-shaped element 16. The opening 18 is equipped with a female screw thread so that, when a bolt 20 with a larger diameter than bolt 17 is screwed into the opening 18, the cap-shaped element 16 can be removed from the shaft section 13, as shown in FIG. 3.

Figure 4:
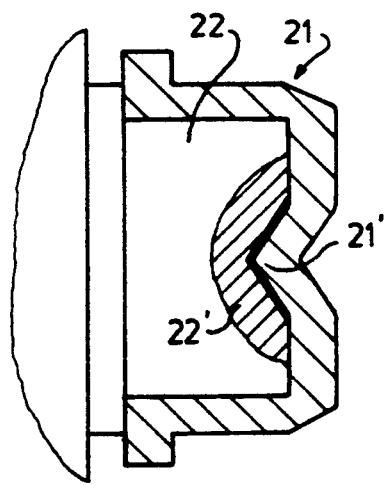
FIG. 4 shows a second embodiment of the cap-shaped element according to the invention.

In the embodiment shown in FIG. 4, the cap-shaped element 21 has a conical, inwardly projecting part 21', formed in the bottom of the cap-shaped element and fitting in a corresponding conical recess 22' formed in the end of the second shaft section 22.

I claim:

1. In a differential with a housing containing a pinion in the form of a bevel gear which together with a first shaft section, constituting one unit with the gear and projecting from its wide end, is held by bearings in the housing, whereby the shaft section may be connected to and driven by a drive shaft, and having a crown gear which operates in conjunction with the pinion and is coupled to a rotating satellite housing located in the differential housing, and in which two freely rotating opposing satellites are held by bearings which operate in conjunction with two opposing gears which are connected to a wheel shaft, and in which the pinion constitutes one unit with a second shaft section projecting from a narrow end of the pinion, which second shaft section is held in the housing by means of a roller bearing which has an outer race installed in an opening in the differential housing and an inner race installed around the second shaft section, the improvement wherein the inner race comprises a generally cap-shaped element having a cylindrical outer surface, a bottom with an inside bottom surface, and a cylindrical inner surface slidably engaged over the end of the second shaft section such that the inside bottom surface of the cap-shaped element bears against the end of the shaft section.

2. A differential according to claim 1, in which the crown gear constitutes one unit with the satellite housing.

3. A differential according to claim 1, in which the bottom of the cap-shaped element has an opening corresponding to a blind bore in the end of the second shaft section, the blind bore having a female screw thread, and a bolt extended through said opening and screwed into said bore.

4. A differential according to claim 3, in which the opening in the bottom of the cap-shaped element has a female screw thread of diameter larger than the diameter of said bolt, whereby when said bolt has been removed, another bolt of larger diameter can be screwed into said female thread in said opening to remove the cap-shaped element from the second shaft section.

5. A differential according to claim 1, in which the end of the second shaft section has a conical recess, corresponding to a conical projection extending inward from the bottom of the cap-shaped element, which projection engages the recess, such that the conical axes of the recess and the projection coincide.

6. A differential according to claim 3, in which the opening is in the middle of the second shaft section.

7. A differential according to claim 5, in which the conical recess is in the middle of the second shaft section.

8. A bearing for a shaft section according to claim 1, in which one of the inner and outer races of the roller bearing has a surface which bears against the end of the second shaft section.

* * * * *